United States Patent
Keys (10) Patent No.: US 8,070,993 B2
(45) Date of Patent: Dec. 6, 2011

(54) COMPOSITE COMPONENT AND METHOD OF MANUFACTURING THE SAME

(75) Inventor: James F. Keys, Northville, MI (US)

(73) Assignee: Shiloh Industries, Inc., Valley City, OH (US)

( * ) Notice: Subject to any disclaimer, the term of this patent is extended or adjusted under 35 U.S.C. 154(b) by 221 days.

(21) Appl. No.: 12/599,795

(22) PCT Filed: May 9, 2008

(86) PCT No.: PCT/US2008/063291
§ 371 (c)(1),
(2), (4) Date: Nov. 23, 2009

(87) PCT Pub. No.: WO2008/141218
PCT Pub. Date: Nov. 20, 2008

(65) Prior Publication Data
US 2010/0244296 A1      Sep. 30, 2010

Related U.S. Application Data (60) Provisional application No. 60/928,878, filed on May 11, 2007.

(51) Int. Cl.
*B29C 45/76* (2006.01)
(52) U.S. Cl. .......... 264/40.4; 425/150; 425/171
(58) Field of Classification Search .......... 264/40.1, 264/40.4, 406–411; 425/140, 141, 145, 150, 425/171, 172
See application file for complete search history.

(56) References Cited

U.S. PATENT DOCUMENTS

| | | | |
|---|---|---|---|
| 4,381,908 A | 5/1983 | Roth | |
| 4,470,786 A | 9/1984 | Sano et al. | |
| 4,509,774 A | 4/1985 | Booher | |
| 4,684,279 A | 8/1987 | Weber | |
| 4,865,793 A | 9/1989 | Suzuki et al. | |
| 5,224,783 A | 7/1993 | Schmidt et al. | |
| 5,288,698 A * | 2/1994 | Banjo et al. | 264/40.1 |
| 5,645,865 A | 7/1997 | Schad et al. | |
| 5,940,949 A | 8/1999 | Rink | |
| 6,030,570 A | 2/2000 | McLaughlin | |
| 6,152,468 A | 11/2000 | Glaser et al. | |

(Continued)

FOREIGN PATENT DOCUMENTS
DE      3332771      3/1985
(Continued)

OTHER PUBLICATIONS
Written Opinion & International Search Report for PCT/US08/63291, Oct. 29, 2008, 8 pages.

*Primary Examiner* — Jill Heitbrink
(74) *Attorney, Agent, or Firm* — Reising Ethington P.C.; Michael C. Adams (57) ABSTRACT

A method of producing a composite component that includes both a structural insert and a plastic casing. According to an exemplary embodiment, the method uses a closed-loop control system and includes the following steps: evaluating the structural insert for various attributes, placing the structural insert in a mold cavity, adjusting the position and/or orientation of the structural insert with respect to the mold cavity based on, among other things, the evaluated attributes, and injecting molten material into the mold cavity so that it at least partially surrounds the structural insert.

25 Claims, 2 Drawing Sheets

U.S. PATENT DOCUMENTS

| | | |
|---|---|---|
| 6,428,732 B1 | 8/2002 | Onoue et al. |
| 6,592,354 B2 | 7/2003 | Kachnic et al. |
| 6,659,482 B2 | 12/2003 | Carlstedt et al. |
| 6,811,169 B2 | 11/2004 | Schroeder et al. |
| 6,923,632 B2 | 8/2005 | Koyama et al. |
| 7,025,921 B2 | 4/2006 | Ilse et al. |
| 7,033,159 B2 | 4/2006 | Kachnic et al. |
| 7,159,880 B2 | 1/2007 | Budde et al. |
| 7,175,408 B2 | 2/2007 | Watanabe et al. |
| 7,205,251 B2 | 4/2007 | Wellman |
| 2001/0045688 A1 | 11/2001 | Royer |
| 2002/0068106 A1 | 6/2002 | Kachnic et al. |
| 2004/0063360 A1* | 4/2004 | Kikuchi ............... 425/110 |
| 2006/0175786 A1 | 8/2006 | Streubel et al. |
| 2007/0138697 A1 | 6/2007 | Takeda et al. |
| 2007/0218157 A1 | 9/2007 | Tsai |

FOREIGN PATENT DOCUMENTS

| | | |
|---|---|---|
| DE | 19931079 | 2/2000 |
| JP | 62148224 | 7/1987 |
| JP | 3-159721 | 7/1991 |
| JP | 2000-127198 | 5/2000 |
| JP | 2000-238043 | 9/2000 |
| KR | 2000-0040252 | 7/2000 |
| KR | 2003-0073715 | 10/2009 |

* cited by examiner

COMPOSITE COMPONENT AND METHOD OF MANUFACTURING THE SAME

REFERENCE TO RELATED APPLICATIONS

This application claims the benefit of U.S. Provisional Ser. No. 60/928,878 filed on May 11, 2007.

FIELD OF INVENTION

The present invention relates generally to composite components and, more particularly, to methods of producing composite components.

BACKGROUND OF THE INVENTION

Composite components can be manufactured by molding a plastic material around a structural insert or other reinforcement. In a typical process, the structural insert is formed according to one of a number of different forming techniques, and is then inserted into a cavity of a molding machine for subsequent molding of the composite component.

SUMMARY OF THE INVENTION

According to one aspect, there is provided a method of producing a composite component that comprises any number of steps. In one step, a structural insert is evaluated for any one of a number of attributes. In another step, the structural insert is placed in a mold cavity of a molding machine. In yet another step, the position of the structural insert is adjusted with respect to the mold cavity. This adjustment is dictated by, among other things, the evaluated attributes. And in another step, molten material is injected into the mold cavity so that the molten material surrounds at least a part of the structural insert.

According to another aspect, there is provided a method of producing a composite component that comprises any number of steps. In one step, a structural insert is evaluated. In another step, dimensional data is obtained about the structural insert from the evaluation. In yet another step, the dimensional data is processed with a control unit. And in another step, at least one locating pin that supports the structural insert in a mold cavity of a molding machine is controlled. In this step, the control unit uses the dimensional data to control the locating pin.

According to another aspect, there is provided a system for producing a composite component that comprises an evaluation device, a molding machine, and a closed-loop control system. The evaluation device evaluates a structural insert. The molding machine has a mold cavity and a drive mechanism. The drive mechanism drives at least one locating pin that supports the structural insert. The closed-loop control system is directly or indirectly electronically coupled to the evaluation device and to the drive mechanism. The closed-loop control system uses data from the evaluation device to generate command signals for controlling the drive mechanism.

DESCRIPTION OF THE DRAWINGS

A preferred exemplary embodiment of the invention will hereinafter be described in conjunction with the appended drawings, wherein like designations denote like elements, and wherein.

DESCRIPTION OF PREFERRED EMBODIMENT

Composite components having both structural and plastic elements can be used in a wide range of applications, including vehicles such as automobiles, trucks, sports utility vehicles (SUVs), cross-over vehicles, all terrain vehicles (ATVs), recreational vehicles (RVs), farm equipment, and construction equipment, to name but a few examples. Some examples of suitable composite components include, but are certainly not limited to, control arms, axle struts, torsion bars, and other chassis components. The term "composite component," as used herein, broadly includes a component having at least one structural element and one plastic element, where the different elements remain separate and distinct within the finished component.

Figure 1:
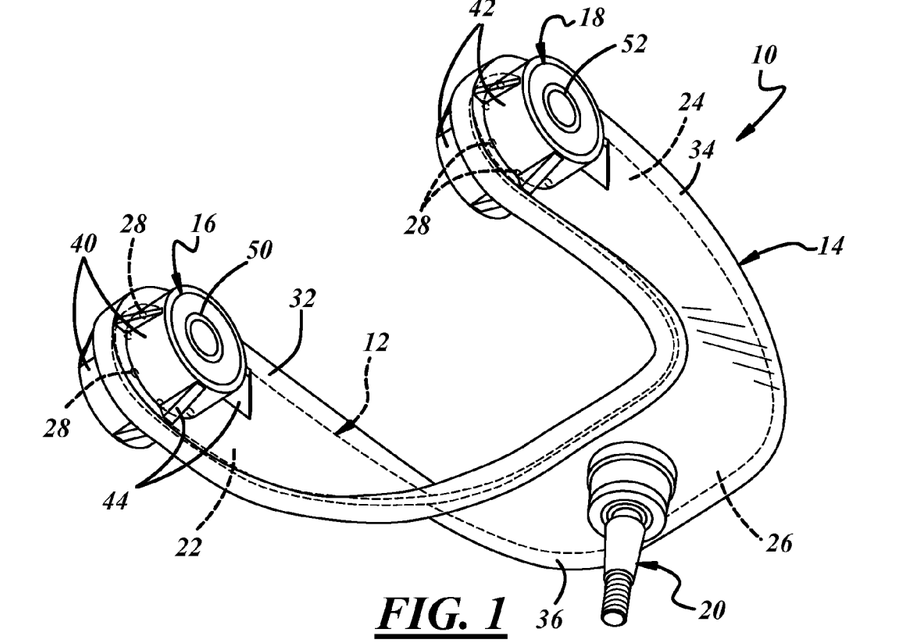
FIG. 1 is a perspective view of an example of a composite component, in this case a control arm assembly for use in a vehicle.

FIG. 1 shows an example of a composite component, in this case a control arm assembly 10 for use in a vehicle, that can be made by an embodiment of the present manufacturing method. It should of course be appreciated that the control arm assembly shown here is but one example of a composite component that can be produced by the manufacturing method subsequently described, as numerous other composite components could be made as well.

Control arm assembly 10 is arranged in an A-arm or wishbone configuration, and can be a member of a suspension architecture that includes an upper control arm, a lower control arm, or both. According to this embodiment, control arm assembly 10 has a generally twisting configuration where different segments of the control arm assembly are aligned in different planes and transition from one segment to another in a fluid or continuous manner. Designing control arm assembly 10 in this way adds to the structural strength of the assembly and aids in the proper distribution of forces that act on the assembly, as is appreciated by those skilled in the art. In the alternative, the control arm assembly could be arranged so that all of its segments are generally coplanar. According to this particular embodiment, control arm assembly 10 generally includes a structural insert 12, a plastic casing 14, a pair of bushings 16, 18, and a ball joint 20.

Structural insert 12 (shown here in phantom lines) acts as a framework to provide control arm assembly 10 with structural integrity and to prevent against total breakdown of the assembly in the event that the part is damaged or breaks during operation. Structural insert 12 is preferably made of a metal or other rigid material having appropriate strength and ductility characteristics including, but certainly not limited to, steel, aluminum, various metal alloys, hard plastic, ceramic, and the like. Also, the structural insert can be formed according to one of a number of different forming operations known in the art, depending on the material; examples of such operations include stamping, casting, cutting, forming, and/or injection molding.

According to the wishbone-type configuration shown here, structural insert 12 has a generally U-shaped body with a pair of parallel legs 22, 24 that extend from a central portion 26. As previously explained, structural insert 12 can follow a twisting configuration such that it has a non-planar contour. Legs 22, 24 each has an opening (not shown in FIG. 1) proximate a distal end to accommodate respective bushings 16, 18, and central portion 26 has a centrally positioned opening (not shown) to accommodate ball joint 20. One or more mechanical interlocking features in the form of holes 28 (shown in phantom lines) can be formed around the periphery of the openings in the respective legs 22, 24. During the injection molding process of plastic casing 14, molten plastic can flow through holes 28 and solidify to provide a secure mechanical interlock between structural insert 12 and plastic casing 14; this mechanical bond is in addition to a chemical bond between the rigid structural material and the plastic. Of course, the mechanical interlocking features can come in other forms and can be located anywhere in structural insert 12. In order to reduce any cutting, tearing, or abrasive interaction by sharp edges of the structural insert against plastic casing 14, all of the edges of the structural insert, including those of the openings, can optionally be machined, ground, coined, countersunk, reamed, covered with a protective material like a grommet, or otherwise smoothed so that jagged edges are removed. The periphery of the structural insert, as well as the various openings, can be formed at the same time that the part is given its desired contour, or they can be provided in a multi-step fabrication process.

Plastic casing 14 serves as a strong and light-weight outer layer of control arm assembly 10, and can, in some circumstances, enable the assembly to be formed in a more complex configuration than is capable with a purely metal component. Plastic casing 14 at least partially surrounds structural insert 12 and can be comprised of various thermoset and/or thermoplastic constituents such as polycarbonate, polypropylene, ABS, fiber-reinforced plastic, and glass-reinforced plastic, to name but a few examples. The plastic casing 14 can be formed by molding molten plastic over structural insert 12, as will be subsequently described. Like the structural insert, the plastic casing shown here is a generally U-shaped component with a pair of legs 32, 34 extending perpendicularly from a central portion 36; each of these components coincides with the corresponding component of the structural insert so that they generally co-extend with one another. Each of the leg portions 32, 34 includes a pair of integrally formed cylindrical bosses 40, 42 that coincide with the openings in the structural insert and are designed to receive bushings 16, 18, respectively. Cylindrical bosses 40 are hollow features that extend from opposite sides of plastic casing 14 and can be strengthened with ribs 44 or other strengthening features. The same applies to the pair of bosses 42.

Bushings 16, 18 are formed in cylindrical bosses 40, 42, respectively, and are designed to accommodate a pivoting movement between the control arm assembly 10 and a vehicle body, chassis, frame, mounting bracket, or other item to which the assembly is attached. According to one embodiment, bushings 16, 18 are comprised of a rubber or elastomeric material and are injection molded right into the cylindrical cavities of the bosses 40, 42 with separate metal sleeves 50, 52 in place. As before, a mechanical interlocking feature (not shown) can be formed between bushings 16, 18 and respective cylindrical bosses 40, 42. Once formed, the bushings with their internal metal sleeves can act as a bearing surface for a journaled shaft that extends through the openings in structural insert 12 and plastic casing 14. In the alternative, bushings 16, 18 could be externally assembled and installed into bosses 40, 42, as opposed to being integrally formed.

Ball joint 20 is located in the openings formed in the central portions of both structural insert 12 and plastic casing 14 and provides a pivotal connection to a component such as a steering knuckle or wheel carrier. Like the bushings, one or more parts of ball joint 20 can be integrally formed in plastic casing 14 or it can be externally assembled and installed. Because the general operation of a control arm assembly is well known in the art, a further detailed explanation of its operation has been omitted.

Figure 2:
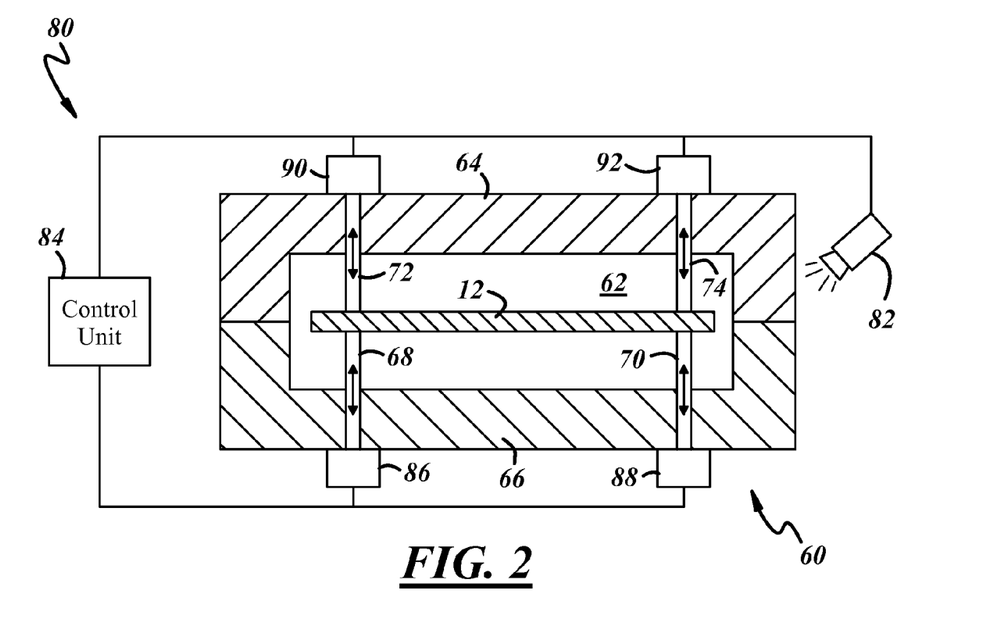
FIG. 2 is a cross-sectional schematic view of an injection-molding machine in a closed position that could be used to manufacture the composite component of FIG. 1.
Figure 3:
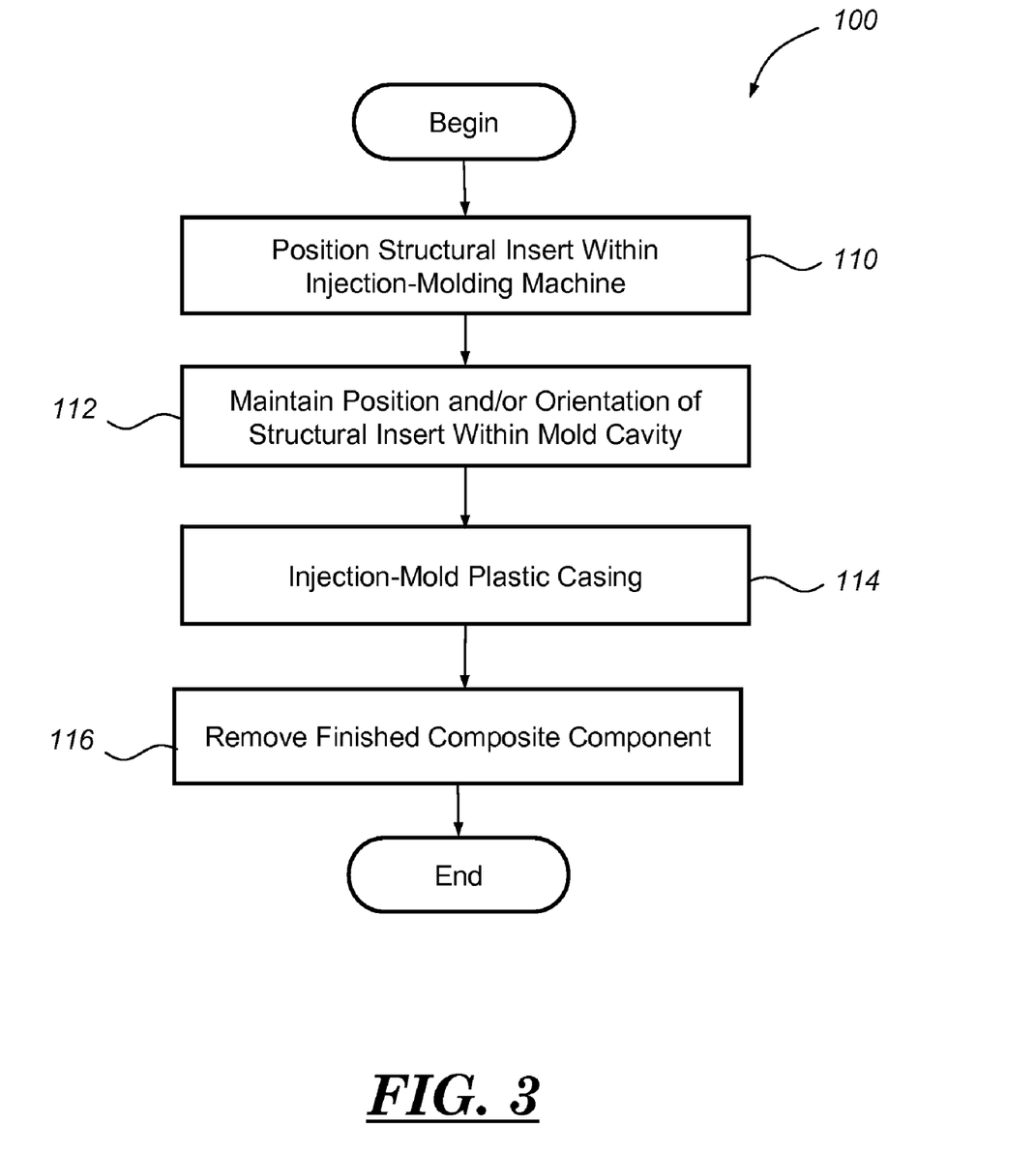
FIG. 3 is a flow-chart showing some of the steps of an embodiment of a manufacturing method that can be used to produce the composite component of FIG. 1.

Turning now to FIGS. 2 and 3, there is described a manufacturing method that includes various steps for producing a composite component, such as control arm assembly 10. Again, the manufacturing method disclosed herein can be used to produce other composite components not shown or described. As is appreciated by the skilled artisan, the exact number of steps, the order of steps, the operating parameters of each step, and the operations performed within each step can be dictated by factors such as the particular composite component being produced and the particular type of molding machine being used. These particulars can vary from those of the exemplary manufacturing method described below. According to one exemplary embodiment, a manufacturing method 100 generally includes steps for: positioning structural insert 12 within a molding machine such as an injection-molding machine 60, maintaining the position and/or orientation of the structural insert 12 with respect to a mold cavity 62, injecting molten resin into cavity 62, and opening machine 60 to remove the component.

In step 110, structural insert 12 is positioned between the upper and lower dies 64, 66 of an injection-molding machine 60 so that it rests on one or more locating pins 68-74. This step can be performed in a number of ways including automatically loading the structural insert with a robotic arm or other automated device, or manually loading the structural insert into the injection-molding machine. In any case, structural insert 12 is properly oriented and held in place in the upper or lower die 64, 66 by clamps, magnets, suction devices, gravity, or any other suitable means known in the art. The particulars of this step may be dictated by, among other things, the orientation of the injection-molding machine (horizontal, vertical, etc.) and the type of injection-molding machine being used (hydraulic, electric, hybrid, etc.).

In step 112, structural insert 12 is maintained in a desired position within mold cavity 62 so that each finished composite component is generally consistent in a mass production operation. In other words, step 112 consistently positions the structural insert in the same position within the mold cavity to avoid situations where a first finished part has its structural insert arranged in a different orientation, with respect to its plastic casing, than a second finished part. The upper and lower dies 64, 66 are brought together under the force of a press to form mold cavity 62, which ultimately defines the outer shape or contours of plastic casing 14 once the composite component is formed. In the example shown, mold cavity 62 completely surrounds structural insert 12 as the structural insert is maintained within the interior of the cavity. In an alternative embodiment, mold cavity 62 only partially surrounds structural insert 12 so that the finished composite component has some structural portions exposed. The actual maintenance of structural insert 12 in a certain position can be achieved through the use of a number of different systems, including the following closed-loop control system 80.

Closed-loop control system 80 generally monitors the position, orientation, and/or dimensions of structural insert 12 and makes adjustments to its position and/or orientation in cavity 62 accordingly. In this particular embodiment, closed-loop control system 80 generally includes a sensing or evaluation device 82, a control unit 84, and one or more driving mechanisms such as servo motors 86-92 for controlling the position of locating pins 68-74, respectively. Evaluation device 82 is designed to determine the position, orientation, dimensions, and/or other attributes of structural insert 12 and provide this information back to control unit 84 for further processing. In one embodiment, evaluation device 82 is a non-contact vision system that includes a digital camera for taking pictures of the structural insert when the upper and lower dies 64, 66 are still separated. This embodiment is schematically shown having a single evaluation device, but multiple evaluation devices could be employed as well. In another embodiment, evaluation device 82 is a charge-coupled device (CCD) image sensor such as a camera, like those provided by the Cognex Corporation of Massachusetts, U.S.A., (www.cognex.com). In another embodiment, evaluation device 82 is a laser vision system with a laser camera, such as those provided by Servo-Robot Inc. of Quebec, Canada (www.servorobot.com). It should be appreciated that other types of evaluation devices, including contact systems like a coordinate-measuring-machine (CMM) using a probe, and non-contact systems using lasers, scanners, x-rays, etc. can also be used. Once the images and/or other information are gathered, they are fed back to control unit 84 which compares the gathered information with a desired position and/or orientation for the structural insert.

In another embodiment, structural insert 12 can be maintained in the desired position and/or orientation in mold cavity 62 with closed-loop system 80 by using evaluation device 82 before the structural insert is positioned within injection-molding machine 60. For example, one or more evaluation devices 82 could gather information and data from a structural insert 12 that is fixtured outside of and away from injection-molding machine 60; for example, in a separate evaluation area. The evaluation device could evaluate or analyze the shape, size, volume, contour, etc. of the structural insert 12—including characteristics such as springback or defects—and send that information to control unit 84 which could then adjust the position of locating pins 68-74 accordingly. In another example, evaluation device 82 can evaluate structural insert 12 as part of an automated loading movement of the structural insert into mold cavity 62. For instance, a robotic arm that carries structural insert 12 to mold cavity 62 could pass or sweep the structural insert across a vision curtain or other area of evaluation device 82. While in this area, structural insert 12 is evaluated. Here, the evaluation could occur on-the-fly in a continuous step in the sense that the loading movement need not be substantially interrupted.

Control unit 84 preferably includes some type of electronic processing device for executing image processing and other types of software that enable it to control the position and/or orientation of the structural insert 12. Control unit 84 is electronically coupled, either directly or indirectly, to one or more evaluation devices 82 such that data can be exchanged between them. In one example, software provided by the manufacturer of the particular evaluation device could be used. Such software would likely have to be customized, tailored, or otherwise altered to work with the particular application at hand. This customization could entail providing the software with inputs or datum pertaining to the particular structural insert and/or the mold cavity being used. For instance, various types of data relating to the expected boundaries, area, volume, position, etc. of the structural insert and/or the mold cavity could be provided to the software. Control unit 84, which can be an independent control unit or can be integrated into the control unit of injection molding machine 60, can execute this software. In an exemplary embodiment, dimensional data is gathered by evaluation device 82 and is provided to control unit 84, and the control unit processes the dimensional data and generates corresponding command signals to control the drive mechanism that moves locator pins 68-74. This type of closed-loop feedback enables the system to take into account variations, discrepancies, defects, etc. in the structural insert; thus, obviating the need for potentially costly machining and other post-fabrication processing steps.

In one example, control unit 84 utilizes one or more closed-loop control techniques known in the art, including proportional-integral-derivative (PID) control. If changes in the position of the structural insert are needed, then control unit 84 outputs command signals to servo motors 86-92 that cause them to raise or lower their corresponding locating pin heights. Movement of the locating pins affects the actual position and/or orientation of structural insert 12 with respect to mold cavity 62 and, in some embodiments, is remeasured by evaluation device 82 in order to provide control unit 84 with further feedback. Although structural insert 12 is schematically shown in FIG. 2 as a simple flat component, it should be recognized that in practice the structural insert will likely have a more complex shape and contour than that shown here, and will likely require locating pins 68-74 to be operated precisely and independent of one another in order to achieve the desired positioning of the part relative to mold cavity 62. Stated differently, control unit 84 is capable of driving the locating pins together, separately, or a combination of both in order to orient structural insert 12 in a desired configuration.

In one example, the desired position can constitute a predetermined distance between structural insert 12 and upper or lower dies 64, 66, or both. By controlling this distance, closed-loop control system 80 is able to generally control the thickness of plastic casing 14 surrounding structural insert 12. Although the closed-loop control system is described above in the context of a system having a vision system and servo motors, it should be appreciated that sensing and evaluation devices other than cameras can be used, and that means for controlling the position of locating pins other than servo motors can be used as well. In short, evaluation device 82 provides control unit 84 with an input (position, orientation, and/or measurements of the structural insert), the control unit processes the input and determines if any changes to the part's position and/or orientation are needed, and then the control unit provides servo motors 86-92 with output (command signals) to adjust the position of locating pins 68-74 before the injection-molding process. In some embodiments, the adjustment of locating pins 68-74 can occur with and/or without structural insert 12 positioned thereon, and before and/or during the injection-molding process.

Attributes evaluated by evaluation device 82 includes, but is not limited to, dimensional data pertaining to the three-dimensional shape of structural insert 12 such as its edges, corners, or any holes. The exact dimensional data will depend on the exact shape of structural insert 12 and includes lengths, widths, heights, surface areas, radii, circumferences, arc lengths, perimeters, and other measurements that are needed to determine values that are pertinent to positioning insert 12 in mold cavity 62 like the volume of the particular shape; this type of data is broadly and collectively referred to as "dimensional data."

Locating pins or chaplets 68-74 are strategically located around the upper and lower dies 64,66 to properly support and position structural insert 12 during the injection-molding process. According to the embodiment of FIG. 2, locating pins 68-74 are adjustably driven by servo motors 86-92 which control the distance that each pin projects out of it respective die half by raising or lowering the pin. The locating pins can be installed in lower die 64, upper die 66, or both, and can themselves be composed of a suitable metallic material that is coated with PTFE or other nonstick substance, so that the solidified plastic does not bond to the pins if the pins remain projected as the plastic solidifies. This of course would leave a depression in plastic casing 14 which could then be filled in the same operation with additional injected molten plastic, or in a subsequent operation which could also include injection molding. In a retracted position, locating pins can be withdrawn into the corresponding die half or they can be flush with the mold cavity surface; in a projected position, the locating pins extend away from the mold cavity surface to engage structural insert 12. In both positions, a seal (not shown) can be provided between the locating pins and the respective die halve(s) such that molten plastic or other material does not get into the bores where the pins retract and project. For example, a seal ring can be inserted in or around the bores so that when the pins are projected, molten plastic does not breach the entrance of the bore at the side of the pins.

In some embodiments, one or more locating pins can be biased toward its fully raised or extended position. For example, a coil spring can be located within a hollowed-out pin and can extend between the pin and a static surface. Taking the example of FIG. 2, upper locating pins 72 and 74 can be biased, while lower locating pins 68 and 70 can be adjustably driven. In operation, lower locating pins 68 and 70 exert a force against upper locating pins 72 and 74 through structural insert 12 which yield the respective biasing force of the springs to a pin-height corresponding to a desired position of structural insert 12 with respect to mold cavity 62.

The injection-molding machine 60 shown in FIG. 2 is simply a schematic representation of an exemplary embodiment. It is therefore possible to include more or less locating pins than that shown there, it is possible to position the locating pins in a different arrangement, it is possible to orient the locating pins at angles other than the generally perpendicular orientation shown here (i.e., have them extend into mold cavity 62 according to an angle), and it is possible to utilize locating pins of various lengths and widths, to name but a few possibilities. According to another embodiment, injection-molding machine 60 could have a first set of locating pins for use with a first structural insert and a second set of locating pins for use with a second structural insert. When the machine is being used to mold around the first structural insert, the second set of locating pins can be retracted to an out-of-the-way position, and vice-versa. This way a single injection-molding machine can be used to create multiple composite components having different structural inserts. Of course, if one wants to injection-mold parts having different exterior shapes, then die halves having the desired shapes will need to be exchanged.

Servo motors 86-92 are electrically coupled to control unit 84 for receiving commands, and are mechanically coupled to respective locating pins 68-74 for precisely controlling their up and down position (away and toward the respective die). In one example, servo motors 86-92 can be equipped with position sensors such as linear encoders or pulse counters to sense the position of the respective locating pin. Those skilled in the art will know the general construction, arrangement, and operation of servo motors such that a detailed description is not needed here. In short, servo motors are servomechanisms that may comprise, among other parts, an electronic circuit board electrically connected to an electric motor, which in turn is mechanically coupled to and drives a set of gears. The gears can have an output shaft that, in this case, is either directly or indirectly connected to locating pins 68-74. A housing may cover the above parts with the exception of the extending output shaft. Skilled artisans will know that other drive mechanisms other than servo motors 86-92 can be used to drive and adjust locating pins 68-74. For example, in an electro-hydraulic drive mechanism, a hydraulic line may communicate between the respective locating pin and an electric actuator. When actuated, hydraulic pressure may be applied to or released from a backing plate of the respective pin, thus respectively raising or lowering the pin. In an electric drive mechanism, electric linear actuators are used to drive and adjust locating pins 68-74.

In one embodiment, evaluation device 82 can be used to evaluate structural insert 12 and to adjust the amount of molten material, such as molten resin, that is used in mold cavity 62 during the molding operation. For example, if the volume of structural insert 12 is greater than a reference volume due to its size, a lesser amount, or shot-size, of molten material is needed in order to produce a finished composite component. In this case, mold cavity 62 has a finite volume and thus control unit 84 or some other unit can adjust the amount of molten material that is injected into the cavity to produce the finished composite component; another exemplary usage of closed-loop control system 80.

According to another embodiment, structural insert 12 can be maintained in mold cavity 62 through the use of one or more plastic standoffs (not shown) that are attached to and extend from the structural insert, instead of using the aforementioned locating pins. A plurality of plastic standoffs or bosses can be temporarily or permanently formed on and projected from an outer surface of one or more sides of the structural insert so that the structural insert is properly positioned within mold cavity 62. The plastic standoffs engage the mold cavity surfaces of upper and/or lower dies 64,66 and in this way perform a similar function as the previously described locating pins. The standoffs are dimensioned to arrange structural insert 12 in mold cavity 62 in the desired position and/or orientation. The plastic standoffs can be formed in a number ways. One example is by molding the standoffs onto structural insert 12 in a first injection-molding process, allowing them to solidify, and then inserting the structural insert with the standoffs into injection-molding machine 60 for a second injection-molding process. In the second injection-molding process, plastic casing 14 is injected around the structural insert and standoffs so that it completely or partially encompasses them. The standoffs can be composed of the same material as that injected in the second injection-molding process, or it can be composed of a different material.

In step 114, plastic casing 14 is formed by injecting molten resin into mold cavity 62 to fill and at least partly surround structural insert 12. Those skilled in the art will know the general process of injecting molten resin into a mold cavity through a plurality of strategically placed sprues such that a complex plastic part can be formed; thus, a detailed description is not needed here. Once the molten resin solidifies and takes the desired shape of the composite component, the upper and lower dies 64, 66 can be separated and opened so that the finished part can be removed. Again, those skilled in the art will know the general cooling, solidifying, and extraction processes such that a detailed description is not needed here. In one example, the molten resin can cool, and thus harden to its final shape, over a pre-determined amount of time as it remains in mold cavity 62; and in another example, a cooling system is built into the injection-molding machine to speed up the solidifying process.

In step 116, injection-molding machine 60 is opened by separating upper and lower dies 64, 66 and the finished composite component is removed. The removal process can be performed in a number of ways including, for example, through automated means involving a robot, a part picker, or a part ejection mechanism, or with manual labor.

Depending on the particular nature of the composite component, additional processing steps may be performed in order to add features like bushings 16, 18 and ball joint 20. As already explained, bushings 16, 18 can be formed by injection-molding a rubber or elastomeric material into bosses or other cavities formed on the composite component, and by adding any additional components like metal sleeves 50, 52. Alternatively, the bushings and ball joints can be externally assembled and installed on the composite component.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of producing a composite component, the method comprising the steps of:
    (a) evaluating a structural insert for one or more attribute(s);
    (b) placing the structural insert in a mold cavity of a molding machine;
    (c) automatically adjusting the position of the structural insert relative to the mold cavity using one or more movable device(s) located within the mold cavity wherein the automatic position adjustment by the movable device(s) determined by a control unit and is at least partially based on the evaluated attribute(s); and
    (d) injecting molten material into the mold cavity so that the molten material at least partially surrounds the structural insert.

2. The method of claim 1, wherein step (a) further comprises evaluating a structural insert using one or more non-contact evaluation device(s).

3. The method of claim 2, wherein the non-contact evaluation device(s) is a charge-coupled device (CCD) camera.

4. The method of claim 2, wherein step (a) further comprises evaluating a structural insert at a location that is remote of the mold cavity and is part of its automated loading movement into the mold cavity.

5. The method of claim 1, wherein step (a) further comprises evaluating a structural insert using a contact evaluation device.

6. The method of claim 1, wherein step (a) further comprises evaluating a structural insert to obtain dimensional data about the structural insert.

7. The method of claim 1, wherein step (c) further comprises adjusting the position of the structural insert using a drive mechanism to raise or lower one or more locating pin(s) that support the structural insert in the mold cavity.

8. The method of claim 7, wherein step (c) further comprises adjusting the position of the structural insert using one or more locating pin(s) that are biased toward a fully raised position.

9. The method of claim 1, wherein step (d) further comprises injecting molten material into the mold cavity in a shot-size of molten material that is at least partially based on the evaluated attributes of the structural insert.

10. A method of producing a composite component, the method comprising the steps of:
    (a) evaluating a structural insert;
    (b) obtaining dimensional data about the structural insert from the evaluation;
    (c) processing the dimensional data with a control unit; and
    (d) controlling one or more locating pin(s) that support the structural insert in a mold cavity of a molding machine, wherein the control unit uses the dimensional data to control the locating pin(s).

11. The method of claim 10, wherein step (a) further comprises evaluating a structural insert using a non-contact evaluation device at a location that is remote of the mold cavity.

12. The method of claim 10, wherein step (a) further comprises evaluating a structural insert using a non-contact evaluation device while the structural insert is supported by the one or more locating pin(s).

13. The method of claim 10, wherein step (a) further comprises evaluating a structural insert using one or more charge-coupled device (CCD) camera(s).

14. The method of claim 10, wherein step (a) further comprises evaluating a structural insert using one or more laser camera(s).

15. The method of claim 10, wherein step (c) further comprises processing the dimensional data with a control unit in order to determine volumetric information about the structural insert.

16. The method of claim 15, wherein step (d) further comprises controlling one or more locating pin(s) by using a drive mechanism to raise or lower the locating pin(s) based on the volumetric information of the structural insert.

17. The method of claim 16, wherein step (d) further comprises controlling one or more locating pin(s) wherein at least one of the locating pin(s) is biased toward a fully raised position.

18. The method of claim 10, further comprising the step of:
    (e) controlling the amount of molten material that is used in the mold cavity based on the dimensional data of the structural insert.

19. A system for producing a composite component, comprising:
    an evaluation device for evaluating a structural insert;
    a molding machine having a mold cavity and a drive mechanism for driving one or more locating pin(s) that support the structural insert; and
    a closed-loop control system electronically coupled to the evaluation device and to the drive mechanism, wherein the closed-loop control system uses data from the evaluation device to generate command signals for controlling the drive mechanism.

20. The system of claim 19, wherein the evaluation device evaluates the structural insert at a location that is remote of the mold cavity.

21. The system of claim 20, further comprising a robotic arm that carries the structural insert across an evaluation area as its being loaded into the mold cavity.

22. The system of claim 19, wherein the evaluation device evaluates the structural insert while the structural insert is supported by the one or more locating pin(s).

23. The system of claim 19, wherein the molding machine includes one or more locating pin(s) that support the structural insert and that is biased toward a fully raised position.

24. The system of claim 19, wherein the closed-loop control system uses data from the evaluation device to generate command signals for controlling the amount of molten material that is used in the mold cavity for producing the composite component.

25. The system of claim 19, wherein the composite component is a chassis component for a vehicle.

* * * * *

UNITED STATES PATENT AND TRADEMARK OFFICE
CERTIFICATE OF CORRECTION

| | | |
|---|---|---|
| PATENT NO. | : 8,070,993 B2 | Page 1 of 1 |
| APPLICATION NO. | : 12/599795 | |
| DATED | : December 6, 2011 | |
| INVENTOR(S) | : James F. Keys | |

It is certified that error appears in the above-identified patent and that said Letters Patent is hereby corrected as shown below:

Column 9, claim 1, line 47, after "wherein" insert -- . --

Column 9, claim 1, line 48, after "device(s)" insert -- is --

Column 11, claim 21, line 3, after "as" delete "its" and insert -- it's --

Signed and Sealed this
Twenty-ninth Day of May, 2012

David J. Kappos
*Director of the United States Patent and Trademark Office*